(12) United States Patent
Subramanian et al.

(10) Patent No.: US 10,880,373 B2
(45) Date of Patent: Dec. 29, 2020

(54) METHOD AND NETWORK TO IMPLEMENT PEER-TO-PEER DATA SYNCHRONIZATION BETWEEN ELECTRONIC FLIGHT BAGS

(71) Applicant: Robust Analytics, Inc., Crofton, MD (US)

(72) Inventors: Shreyas Subramanian, Herndon, VA (US); Hugo Kang, Crofton, MD (US)

(73) Assignee: ROBUST ANALYTICS, INC., Crofton, MD (US)

( * ) Notice: Subject to any disclaimer, the term of this patent is extended or adjusted under 35 U.S.C. 154(b) by 135 days.

(21) Appl. No.: 16/279,609

(22) Filed: Feb. 19, 2019

(65) Prior Publication Data

US 2020/0267218 A1 Aug. 20, 2020

(51) Int. Cl.
*H04L 29/08* (2006.01)
*H04L 29/06* (2006.01)

(52) U.S. Cl.
CPC ........ *H04L 67/1095* (2013.01); *H04L 67/104* (2013.01); *H04L 67/141* (2013.01); *H04L 63/0428* (2013.01)

(58) Field of Classification Search
CPC . H04L 67/1095; H04L 67/141; H04L 67/104; H04L 63/0428
See application file for complete search history.

(56) References Cited

U.S. PATENT DOCUMENTS

| | | | |
|---|---|---|---|
| 6,438,468 B1 | 8/2002 | Muxlow et al. | 701/3 |
| 7,984,190 B2 | 7/2011 | Rhoads | 709/248 |
| 8,170,988 B2 | 5/2012 | Yukawa et al. | 707/622 |
| 8,340,067 B2 | 12/2012 | Buga et al. | 370/338 |
| 8,401,021 B2 | 3/2013 | Buga et al. | 370/395.42 |
| 8,732,233 B2 | 5/2014 | Allen | 709/203 |
| 8,751,067 B2 | 6/2014 | Pham | 701/3 |
| 8,831,795 B2 | 9/2014 | Cabos | 701/3 |
| 9,402,182 B1 | 7/2016 | Henzl et al. | |
| 9,563,580 B2 | 2/2017 | Warner et al. | |
| 9,650,153 B2 | 5/2017 | Hathaway | |
| 9,719,799 B2 | 8/2017 | Pandit et al. | 701/33 |
| 2007/0127460 A1 | 6/2007 | Wilber et al. | 370/389 |
| 2009/0070841 A1 | 3/2009 | Buga et al. | 725/116 |
| 2009/0089693 A1 | 4/2009 | Fahy | 715/764 |
| 2011/0255506 A1 | 10/2011 | Toth et al. | 370/331 |
| 2012/0143405 A1* | 6/2012 | Cabos | G07C 5/008 701/3 |
| 2016/0019793 A1 | 1/2016 | Fournier et al. | |

(Continued)

OTHER PUBLICATIONS

Emmanuel Perrin et al., "*Study of Electric Field Radiated by Wifi Sources Inside an Aircraft—3D Computations and Real Tests*", 2008.

(Continued)

*Primary Examiner* — Kim T Nguyen
(74) *Attorney, Agent, or Firm* — Stein IP, LLC

(57) ABSTRACT

A network of connected devices which is on-board an aircraft, including a plurality of connected devices, wherein at least one of the connected devices receives information from a source external to the network, and a consensus component to perform consensus on the at least one connected device which receives the information from the source to determine a main master and whether the information is correct, wherein the main master sends the correct information to the other device or devices.

17 Claims, 7 Drawing Sheets

(56) References Cited

U.S. PATENT DOCUMENTS

| | | |
|---|---|---|
| 2016/0360281 A1 | 12/2016 | S et al. |
| 2017/0063995 A1 | 3/2017 | Gunn et al. |
| 2017/0178420 A1 | 6/2017 | Byrd, Jr. |
| 2017/0187539 A1 | 6/2017 | Thompson et al. |
| 2018/0225651 A1* | 8/2018 | Stone .................. G06Q 20/14 |

OTHER PUBLICATIONS

M. Schnell Schreckenbach et al., "*Newsky—Networking the Sky for Aeronautical Communications*", 2007, pp. 1-8.
M. Werner et al., "*Aeronautical Broadband Communications Via Satellite*", 2001.
Min et. al., "*Aeronautical Broadcast and Communication System*", 2006.
Volner, "*Aircraft Data Networks Integrated System*", Dec. 2011, pp. 308-314.
Chris A. Wargo et al., "*Security Considerations for the e-Enabled Aircraft*", 2003, pp. 1-18.

\* cited by examiner

METHOD AND NETWORK TO IMPLEMENT PEER-TO-PEER DATA SYNCHRONIZATION BETWEEN ELECTRONIC FLIGHT BAGS

BACKGROUND OF THE INVENTION

1. Field of the Invention

Aspects of the present invention relate to a method of synchronizing data and applications hosted on two or more Electronic Flight Bags (EFBs) using a software framework and a peer-to-peer network.

2. Description of the Related Art

Aircraft today are connected to the internet via satellite based communication devices. A network of connected devices that are on-board the aircraft connect to the internet, and to each other using the communication infrastructure that is already set up in the aircraft through satellite based communication devices. One example of a connected device on-board an aircraft is an Electronic Flight Bag (EFB), generally comprising a processing system and a display system. The processing system receives, stores, transforms and performs analytics on data through dedicated applications which then render information onto the display system. This information may include, among other things, flight manuals, checklists, charts, maintenance related information, and airport related information, various navigation displays, and aircraft system data (as in the description of a "Next Generation Electronic Flight Bag" in U.S. Pat. No. 9,719,799, which builds upon a basic EFB description in U.S. Pat. No. 8,751,067).

Several communication architectures have been proposed and implemented in order to send data to an EFB on-board an aircraft. These senders of data can be ground based, cloud based or on-board systems. US Pat. Pub. 20110255506 introduces systems and methods for integration of an IP-based data link in existing avionics architectures that include an air-ground data link connecting a ground based server to EFB devices on board. Several EFB manufacturers and application developers make use of this air-ground IP-based link to send and receive flight critical information. U.S. Pat. No. 6,438,468 covers a system that can provide generic data and related alerts to the aircraft using a system server, vehicle server and an administrative application. U.S. Pat. No. 8,831,795 describes this process of sending data from a ground database to an EFB application as "data synchronization," where data can include raw data, text, images, PDFs, etc. Other patents use "data synchronization" to describe the process of exchanging data between ground based resources and the aircraft (US Pat. Pub. 20120143405), and ground based systems and on-board mobile platforms like EFBs (U.S. Pat. No. 8,170,988). To ensure security and authentication of data transmissions, US Pat. Pub. 20170187539 adds a method to guarantee that any communication comes from the source that it claims to be coming from.

Several other prior inventions deal with sending data from on-board aircraft systems to an EFB, or from an EFB to an on-board system. US Pat. Pub. 20170063995 introduces a method that sends FMS in-memory data to EFBs via an abstract data layer. In US Pat. Pub. 20170178420, a system that streams flight critical data in near-real-time from the Flight Data Recorder (FDR) to a central server (referred to as a cloud/on-board service in this document) was introduced. US Pat. Pub. 20160360281 includes data that can be obtained from any storage device including an Aircraft Interface Device (AID) and distributes this data using a multipath communication management system. Related art also includes on-board communication of data from the Flight Management System (FMS) to portable electronic devices (US Pat. Pub. 20170063995 and U.S. Pat. No. 9,650,153) including EFBs, processing, enhancing and graphically presenting the data obtained from the FMS within an EFB device (US Pat. Pub. 20160019793 and US Pat. Pub. 20090089693). U.S. Pat. No. 8,732,233 introduces an apparatus that makes it possible for flight crew members to remove the portable device or EFB from the aircraft, use it to enter information, and then transfer this information to an EFB at a later point in time. While the aforementioned patents/publications utilize wired connections to achieve data communication within the aircraft, U.S. Pat. No. 9,563,580 deals with the process for wireless transmission of aircraft sensor data to EFBs. U.S. Pat. No. 9,402,182 also uses wireless communications for automated distribution of login credentials to multiple EFBs. Systems and methods have also been introduced for delivering data to an aircraft using a wireless connection (US Pat. Pub. 20090070841), prioritizing the communication of this data (U.S. Pat. No. 8,401,021), and sharing data with other aircraft with EFB devices on-board (U.S. Pat. No. 8,340,067).

Peer-to-peer communication between devices (or more specifically, applications installed within these devices) similar to EFBs (phones, tablets, portable computers, etc.), although prevalent in various fields, are rather uncommon in on-board flight systems. US Pat. Pub. 20070127460 uses an on-board open data network to facilitate communication between applications related to the operation of an aircraft (U.S. Pat. No. 7,984,190).

Recent studies have pointed out that while there exists on-board communication to enable air-ground, bidirectional communication as well as peer to peer communication, it is plagued by practical issues. The Perrin et al. study in 2008 titled *Study of Electric Field Radiated by WiFi Sources Inside an Aircraft-3D Computations and Real Tests* relates to the electric field radiated by WiFi sources such as routers and devices; this electric field interacts with objects within the cabin including aircraft parts, seats, baggage, people and electronic devices, therefore shielding and distorting WiFi signals received at each device. The *NEWSKY project, 2007, NEWSKY-Networking the Sky for Aeronautical Communications*, integrates multiple communication systems (such as satellite links, VHF networks and on-ground links like WIMAX) into a seamless, global network for aeronautical communications. The project identified several challenges including the use of appropriate routing algorithms and system level resource management to ensure that the best link is available to any end point. Satellite based internet provided by Inmarsat and Globalstar have not been designed to be future-proof and have, been reported to have multiple deficiencies including coverage problems at high altitudes, loss of connection due to external factors, and extreme antenna steering requirements at lower elevation angles. Additionally, although aeronautical channel characterization has proven that frequencies up to the Ka band and above are suitable for aeronautical communication systems, Ku and C band links are still in use due to lower cost. Furthermore, according to Werner et. al., 2001, *Aeronautical Broadband Communications Via Satellite*, positioning the satellite antenna on the aircraft fuselage in positions other than a few limited location options worsens the quality of the provided link due to the aircraft tail shadowing the signal from the satellite. Proposed hybrid Ku and Ka band systems such as the Aeronautical Broadcast and Communication System (ABCS) from Nubron promise to increase speed and reliability of the downlink and uplink between the satellite and ground by using a Ka band, but are still exposed to Ku band limitations when communicating between the aircraft and the satellite (Min et. al., 2006, *Aeronautical Broadcast and Communication System*).

In addition to unreliable links and unavailable connections during several phases of flight, security threats via the provided network may originate from outside the airplane (called "external" security threats) via the connected ground station or the satellite system providing internet, or from inside the airplane (called "internal" security threats) from unauthorized devices connecting to various segments of the provided on-board network (see Volner, 2011, *Aircraft Data Networks Integrated System*). A comprehensive survey of all security considerations for "e-Enabled aircraft" can be found in Wargo and Dhas, 2003, *Security Considerations for the E-enabled Aircraft*. In this survey, a wide variety of security threats were studied that are still relevant in current aircraft internet networks; —pre-production compromises through applications, substitution of parts (Trojans), viruses, worms, Denial of Service attacks, OS specific attacks, content exploitation (via information presented to passengers) and authentication bypass (theft of credentials or spoofing). Existing security enhancements in the transport layer of communication including Secure Socket Layer or SSL has the advantage of mandating that applications only be slightly modified, however, there is a need to constantly maintain context for every connection. Network layer security has the advantage of sharing key management infrastructure across multiple applications, therefore reducing the overhead imposed by key negotiation. However, issues such as non-repudiation of data and the difficulty of exercising control on a per-end-user basis still exists. Datalink layer security has limited scalability and works well only with dedicated links. As mentioned in Wargo and Dhas, 2003, Security Considerations for the E-enabled aircraft, there is still no guarantee that the messages received by an EFB application on-board an aircraft are, one, from the claimed sender; two, contain the original data from the sender; three, have not been inspected or modified by a third party after the sender sent this information; and four, include a notification to the sender guaranteeing that the message has been delivered to the intended recipient. Given the current unreliable internet connections on-board, suspicious changes to incoming data packets may be ignored. This is especially dangerous when the end user is a pilot, and the devices being used are EFBs.

Applications that depend on on-board, reliable and fast internet connection such as the next generation infotainment systems, in-flight office services, telemedicine applications, data intensive logistics and maintenance applications, pilot EFB applications will not be possible without solving several of the aforementioned problems first. However, this is a task that involves satellite and aircraft designers and manufacturers as well as contributions from the in-flight internet and infotainment industry. What is needed in the near term is a solution to bridge the gap between current in-flight internet services with its reported issues to the next generation end-to-end secure in-flight internet service. Some of these applications may also need to be run offline, using data obtained so far, since connections can be highly unreliable. In special cases, even where the internet connection is stable, two devices may obtain two different, yet similar looking messages from a source, and may be a cause for confusion in a safety critical environment. Lastly, the related art includes descriptions of aircraft in a ground-satellite-aircraft network as a single endpoint, but does not explicitly acknowledge that the multiple (EFB) devices connected to the internet inside the aircraft are all separate endpoints.

SUMMARY OF THE INVENTION

Therefore, what is proposed is a method and network to address the aforementioned issues related to internet connectivity and resulting effects on-board an aircraft.

Specifically, aspects of this invention address issues that exist in on-board internet connections that may manifest as safety critical information loss or modification before being presented on an EFB. Examples of how unreliable connections can manifest as information loss or modification are discussed briefly in the following examples. Highly fluctuating and unreliable internet connections may cause one EFB in the network to receive a packet, but another EFB device in the same network to time out and not receive the same packet, although both EFB devices were intended recipients of this packet of information. Loss of a connection throughout the aircraft, on the other hand, may force the local EFB devices to hold different information, with no mechanism to share the latest available information inside the aircraft through a peer-to-peer network even when there is no internet connectivity, and then continue receiving packets seamlessly when internet connection is re-established. Lastly, applications that act as sources of information, with multiple EFBs being intended recipients of this information, may send different messages to different EFB devices. Reasons for sending different messages include but are not limited to having multiple, individual, source to sink (e.g., server to EFB device) connections with varying levels of reliability that may cause one or more of these connections to drop, or having the source of data regenerate the data before sending the same information to multiple devices, but not replicating the sent data exactly, or having a malicious source whose intended effect is to send different data to different devices.

Also, what is proposed is a method and network to address the aforementioned issues related to internet connectivity and resulting effects on-board an aircraft. Specifically, aspects of this invention address issues that exist in on-board internet connections that may manifest as safety critical information loss or modification before being presented on an EFB. Examples of how unreliable connections can manifest as information loss or modification are discussed briefly in the following examples. Highly fluctuating and unreliable internet connections may cause one EFB in the network to receive a packet, but another EFB device in the same network to time out and not receive the same packet, although both EFB devices were intended recipients of this packet of information. Loss of a connection throughout the aircraft, on the other hand, may force the local EFB devices to hold different information, with no mechanism to share the latest available information inside the aircraft through a peer-to-peer network even when there is no internet connectivity, and then continue receiving packets seamlessly when internet connection is re-established. Lastly, applications that act as sources of information, with multiple EFBs being intended recipients of this information, may send different messages to different EFB devices. Reasons for sending different messages include but are not limited to having multiple, individual, source to sink (e.g. server to EFB device) connections with varying levels of reliability that may cause one or more of these connections to drop, or having the source of data regenerate the data before sending the same information to multiple devices, but not replicating the sent data exactly, or having a malicious source whose intended effect is to send different data to different devices.

Aspects of this invention help ensure that information originating from within outside the aircraft, that is distributed to connected devices on-board the aircraft do not have any discrepancies which may appear in the form of 1) one or more connected devices not receiving information while other connected devices receiving the information that was intended to be received; 2) one or more connected devices receiving different information than other connected devices, wherein the intention was to send the same information to all connected devices on-board the aircraft; or 3) sending information from one connected device to one or more connected devices on-board or external to the aircraft, such that there is information loss or discrepancies. This is achieved by detecting and solving potential informational loss or discrepancies among multiple devices which may act as the source of information on-board the aircraft. A typical flow of information where this invention is applicable involves the sending of information from a cloud/on-board device, which acts as the original source of information, to two or more devices on-board the aircraft, which act as the intermediate sources of information to other connected devices on-board the aircraft. Before sending the original information received from the cloud/on-board device, the intermediate sources of information on-board the aircraft that received this original information from the cloud/on-board device, resolve discrepancies using consensus algorithms, and then distribute this correct information to the intended recipients on-board the aircraft.

According to an aspect of the present invention, there is a non-transitory machine-readable medium storing a non-transitory, tangible computer program product comprising computer program code which when executed allows applications on an EFB device to share information using a peer-to-peer network on-board an aircraft, with or without internet connectivity established through satellite or ground connectivity, while also guaranteeing security by confirming that messages received on each EFB are one, from the claimed sender; two, contain the original data from the sender; three, have not been inspected or modified by a third party after the sender sent this information; and four, include a notification to the sender guaranteeing that the message has been delivered to the intended recipient.

According to an aspect of the invention, a network of connected devices which is on-board an aircraft, comprises: a plurality of connected devices, wherein at least one of the connected devices receives information from a source external to the network; and a consensus component to perform consensus on the at least one connected device which receives the information from the source to determine a main master and whether the information is correct; wherein the main master sends the correct information to the other device or devices.

According to an aspect of the invention, a method for a network of connected devices which is on-board an aircraft, comprises: receiving information by at least one of a plurality of connected devices from a source external to the network; performing consensus on the at least one connected device which receives the information from the source to determine a main master and whether the information is correct; and sending the correct information from the main master to the other device or devices.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings. The embodiments are described below in order to explain the present invention by referring to the figures. The present invention is illustrated by way of example and not limitation in the figures of the accompanying drawings in which like references indicate similar elements.

DETAILED DESCRIPTION OF THE EMBODIMENTS

Figure 1:
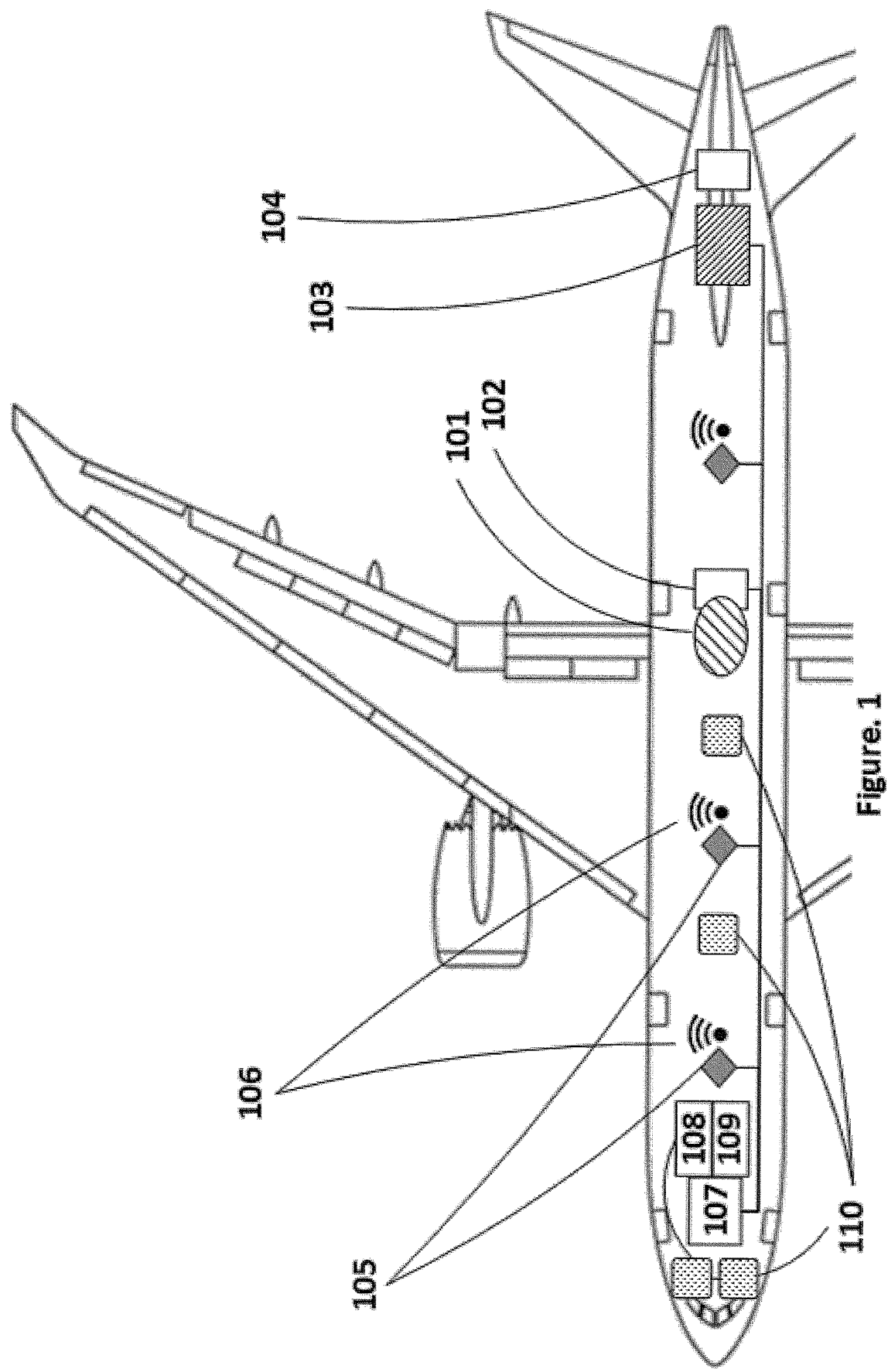
FIG. 1 illustrates a schematic overview of an on-board communication network to provide internet connectivity to application installed onto devices, including but not limited to EFBs.

Reference will now be made in detail to the present embodiments of the present invention, examples of which are illustrated in the accompanying drawings, wherein like reference numerals refer to the like elements throughout. The embodiments are described below in order to explain the present invention by referring to the figures. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" or "another embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

FIG. 1 illustrates a schematic overview of an on-board communication network that provides internet connectivity to devices via a satellite connection. An antenna 101 receives the satellite signal for sending and receiving data packets. These data packets are translated by a converter 102 before sending outbound communication to the satellite through the antenna 101, and after receiving satellite communications through the antenna 101. The converter 102 routes packets through a modem 103 that provides access to the internet. The modem 103 and other components in FIG. 1 receive power from a power supply unit 104. The modem 103 is connected to one or more wireless access points 105, each connected to a WiFi router or WiFi antenna 106 that provides wireless access to the internet. Several aircraft also contain a cloud/on-board service 107 that contains airline or aircraft specific data, processing elements, code or software. Recently, Tablet Interface Devices (TID) 108 and Aircraft Interface Devices (AID) 109 have been introduced to send and receive data, to and from aircraft data buses, systems and sensors. Devices 110 used in the cockpit by pilots (also called EFB devices) are similar to other devices used by passengers and crew in the main cabin in the perspective of our discussion on peer-to-peer networks. In the following discussion, the cloud/on-board service 107 on the ground can be referred to as "central server," "cloud server," "cloud service" or "on-board service" given that data and programs running on the cloud/on-board service 107 or on the cloud may be sources of unique information. A centralized network on-board the aircraft exists when all devices 110 connect to the internet via the wireless access points 105. In peer-to-peer networks, some devices 110 have a direct connection to other devices 110 on-board the aircraft. This enables the devices 110 to communicate with each other directly rather than via the cloud/on-board service 107 or any other internet dependent mechanism. Existing centralized networks for on-board devices 110 cause the aforementioned issues related to insecure communications and faulty delivery of messages. In the present discussion, the peer-to-peer network includes elements 101-110, but in specific contexts may include a network of devices 110 and the cloud/on-board service 107. Devices 110 may or may not have direct access to a data source or program generating unique data residing on the cloud/on-board service 107 or access to the internet.

Figure 2:
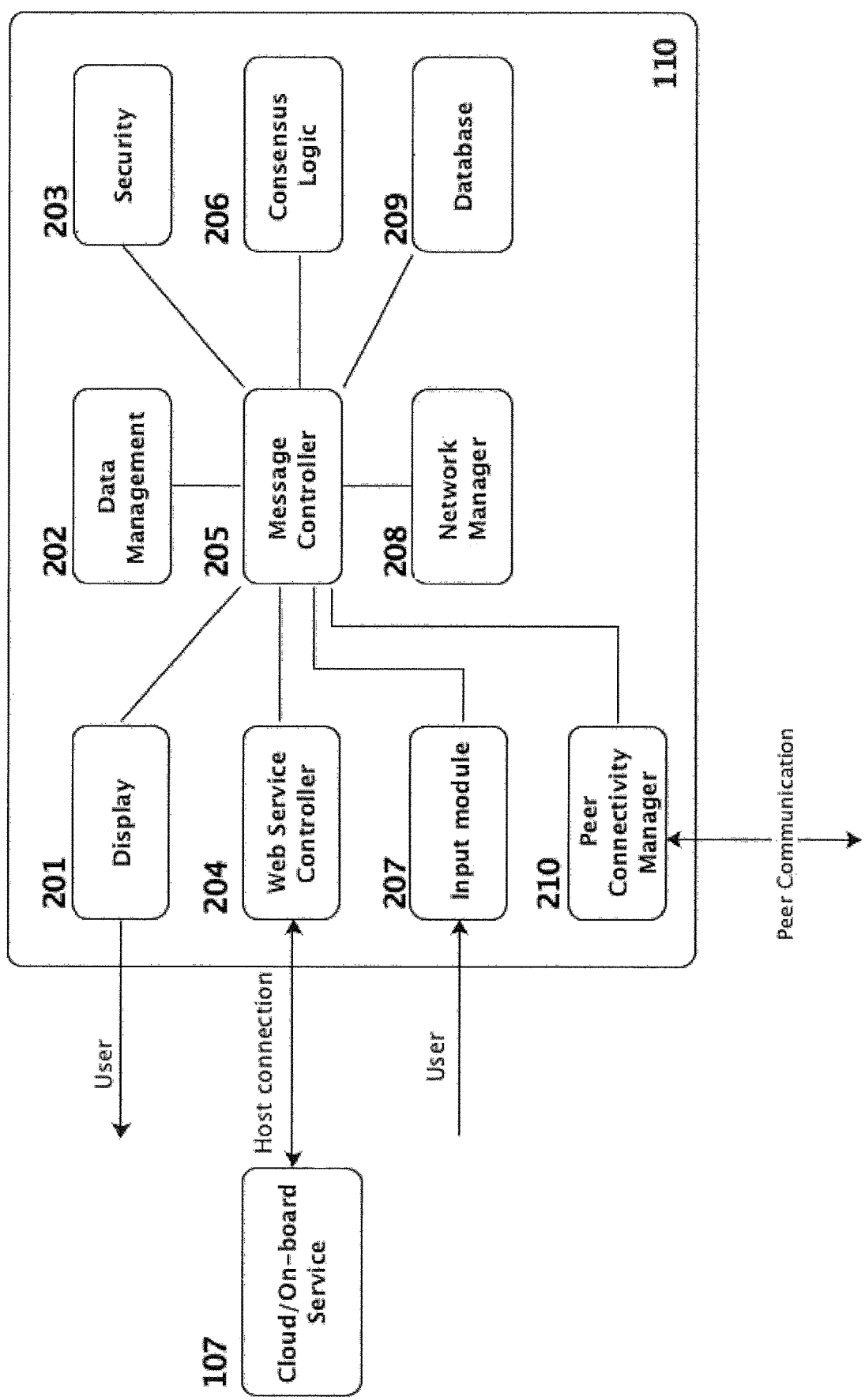
FIG. 2 shows a schematic of various components within the EFB device relevant to aspects of the present invention.

FIG. 2 shows the main components relevant to the present discussion within a device 110 that is part of the peer-to-peer network. The following discussion describes functions of various components 201-211. Each device 110 contains a display component 201 for processing graphics received from the device operating system before rendering information on a monitor or display. Note that the display component 201 is a processing unit, and not the actual, physical monitor or display that is connected to 201. A common example of a display component is a graphics card or a Graphics Processor Unit (GPU). A data management component 202 performs data marshalling, analysis, parsing, various calculations and instructions to store and retrieve data in and from a database component 209 respectively. A security component 203 performs data encryption, decryption, data validation, user authorization and message authentication. A web service controller 204 enables communication between the device 110 and the cloud/on-board service 107. A message controller 205 is a central component that decides how a message is received, transformed, and sent using various other connected components from 201-210, and also handles user interaction and requests from other components. A consensus logic component 206 uses pre-defined consensus rules to decide which of the received messages is the correct message. In this context, a correct message can also mean a latest message, most meaningful message, most agreed-upon message, or most error free message. While the consensus logic component 206 only provides information to the message controller 205 regarding its decision as to which of the received messages is the correct message, the message controller 205 along with other components. All devices 110 have access to the same consensus rules, and therefore independently come to the same conclusion when there is a conflict in deciding what is the latest received message. In addition to the correct message, the consensus logic component 206 can also identify the device 110 that is the source of the correct message. An input module 207 receives and validates user input. A network manager 208 generates a routing solution (that may or may not be optimal) to send a message from one device to another device 110, or in any direction between a device 110 and the cloud/on-board service 107. A database component 209 receives, stores, organizes and provides access to data received via the message controller 205. A peer connectivity manager 211 enables a device to connect to another device 110 to form the peer-to-peer network via communication protocols including but not limited to WiFi, NFC and Bluetooth. The components 201-211 map to functions that can all be performed within/on a multi-purpose processor, and both the peer connectivity manager 211 and the display component 201 may be dependent on separate hardware such as GPUs or WiFi chips.

Devices 110 that are connected via the web service controller 204 to the cloud/on-board service 107 are called "Candidate Masters" or CMs. In other words, CMs are connected to unique sources of information on the cloud/on-board services 107. Multiple CMs in the peer-to-peer network receive information from the cloud/on-board service 107. At this point we recognize three cases—case one, all CMs receive the same message from the cloud/on-board service 107—in this case, since all CMs receive the same message from the cloud/on-board service, there is no need for consensus, and additionally, any consensus algorithm would result in selecting the message received by any one of the CMs; case two, one or more CMs do not receive the message while others CMs do—in this case, a consensus algorithm will select the message received by one of the CMs in the network that received the message from the cloud/on-board service 107; and case three, where one or more CMs receive a different message compared to other CMs—in this case, a consensus algorithm is used to select which message sent from the cloud/on-board service 107 to CMs is the correct message. In this context, a correct message is defined by the consensus rules. Some examples of a correct message are a latest message, most meaningful message, most agreed-upon message, or most error free message. Being part of a peer-to-peer network, the message controller 205 may need to distribute the message to other devices 110 in the network. These devices 110 may be directly or indirectly connected to CMs, and therefore may receive conflicting information as per the second and third cases described above. Therefore, before distributing a message to one or more devices 110, CMs implement the consensus rules in consensus logic component 206 individually and decide as to which of the CMs is the "Main Master" (MM) that contains the correct incoming message to distribute to one or more devices 110.

As a result of CMs independently executing the consensus rules, only one MM is selected. Note that the "correct" incoming message may also be called the ground truth. As an example of implementing a consensus rule to decide which candidate master is the main master MM, assume that there are initially two CMs in the peer-to-peer network. Further, assume that the consensus rule to determine the ground truth is the number of messages received in the database 209. Therefore, if according to case two above, one CM receives the incoming message from the cloud/on-board service 107, and the other CM does not, the first CM has a greater number of messages in the database 209. Therefore, according to the consensus rules in the consensus logic component 206, both candidate masters decide independently that the candidate master which received the new message is the MM. The message controller 205 in the MM then decides to distribute the correct message (i.e., ground truth) to one or more other devices 110 in the peer-to-peer network. While EFB devices 110 are popularly computer tablets or smartphones, they may also be a collection of components 201-211 implemented in various kinds of hardware (including, but not limited to, chips, CPUs, GPUs, FPGAs, ASICs, DSP, APU, and any other capable processing component) that are all treated as "processing elements or processor" in our discussion. These processing elements may be singular or plural. The processing element may use volatile or non-volatile storage or memory for the database component 209 including but not limited to ROM, RAM, SDRAM, DRAM, SRAM, flash Memory, MRAM, D-RAM or P-RAM. The processing elements contain software code, or a non-transitory machine-readable medium storing a non-transitory, tangible computer program product comprising computer program code which when executed by the processing elements, causes the elements 201-211 to perform the operations as disclosed herein.

Figure 3:
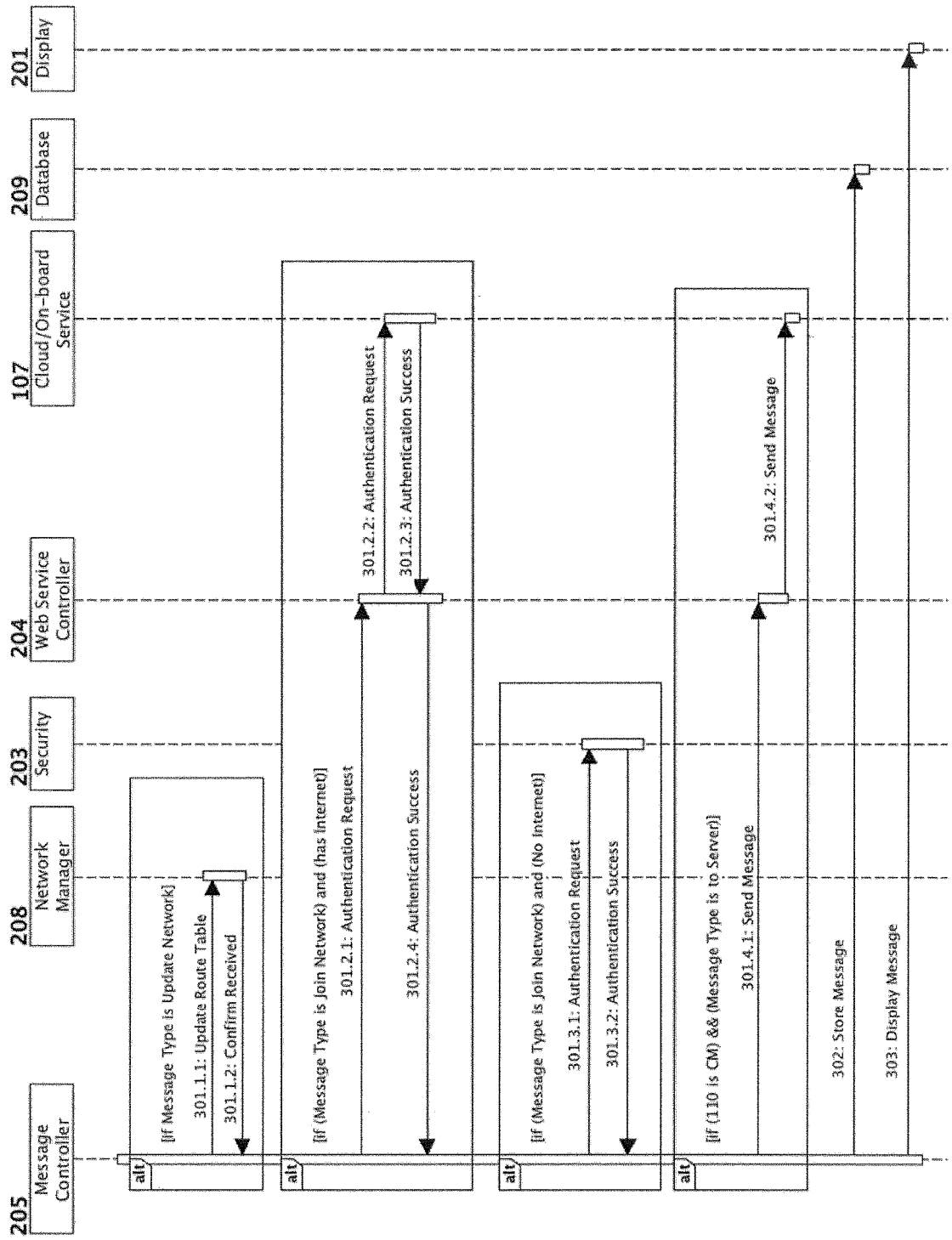
FIG. 3 illustrates the process for a device to join a peer-to-peer network with internet connection to a cloud/on-board service.
Figure 4:
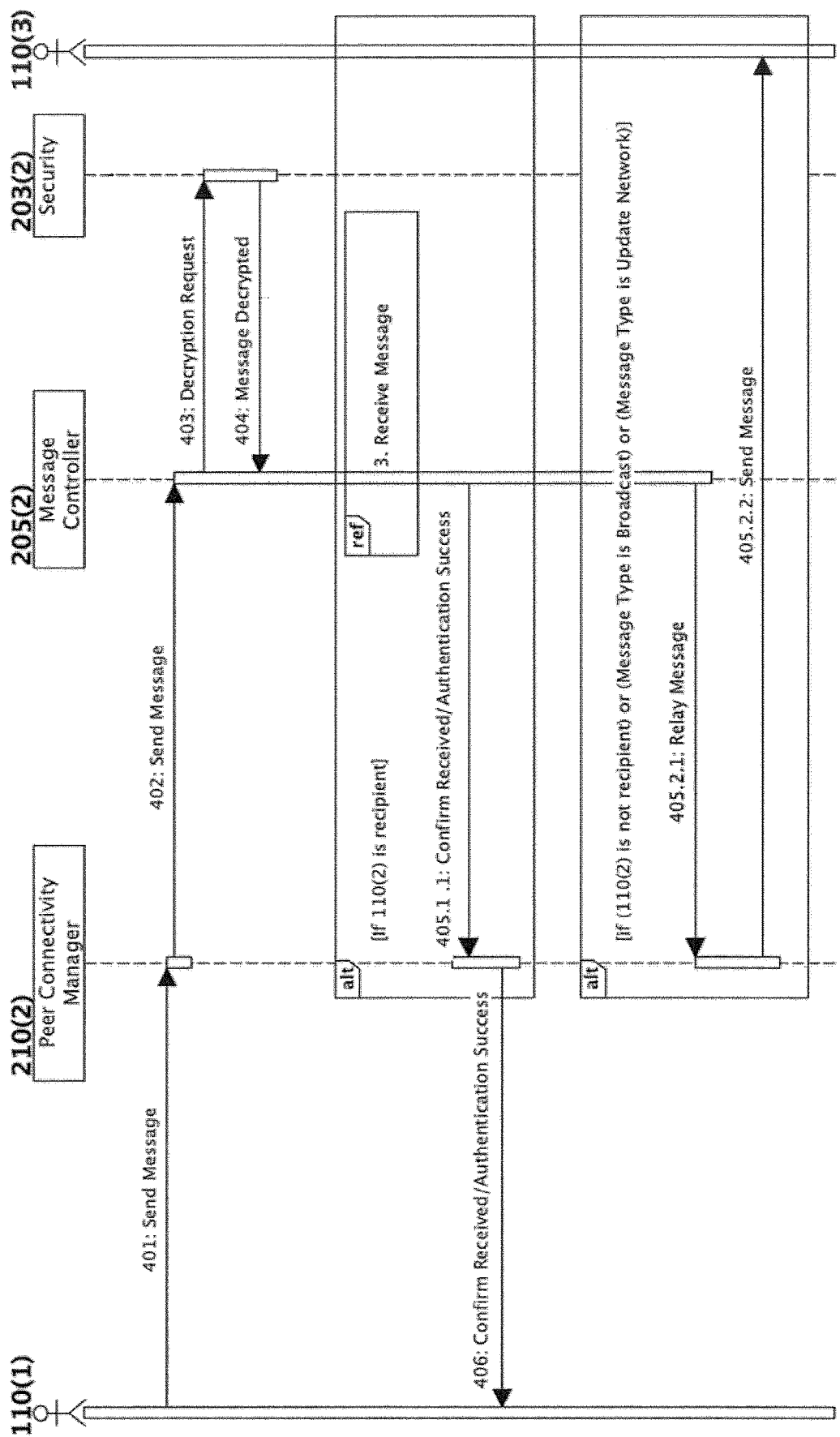
FIG. 4 illustrates the process for a device to join a peer-to-peer network without internet connection to a cloud/on-board service.
Figure 5:
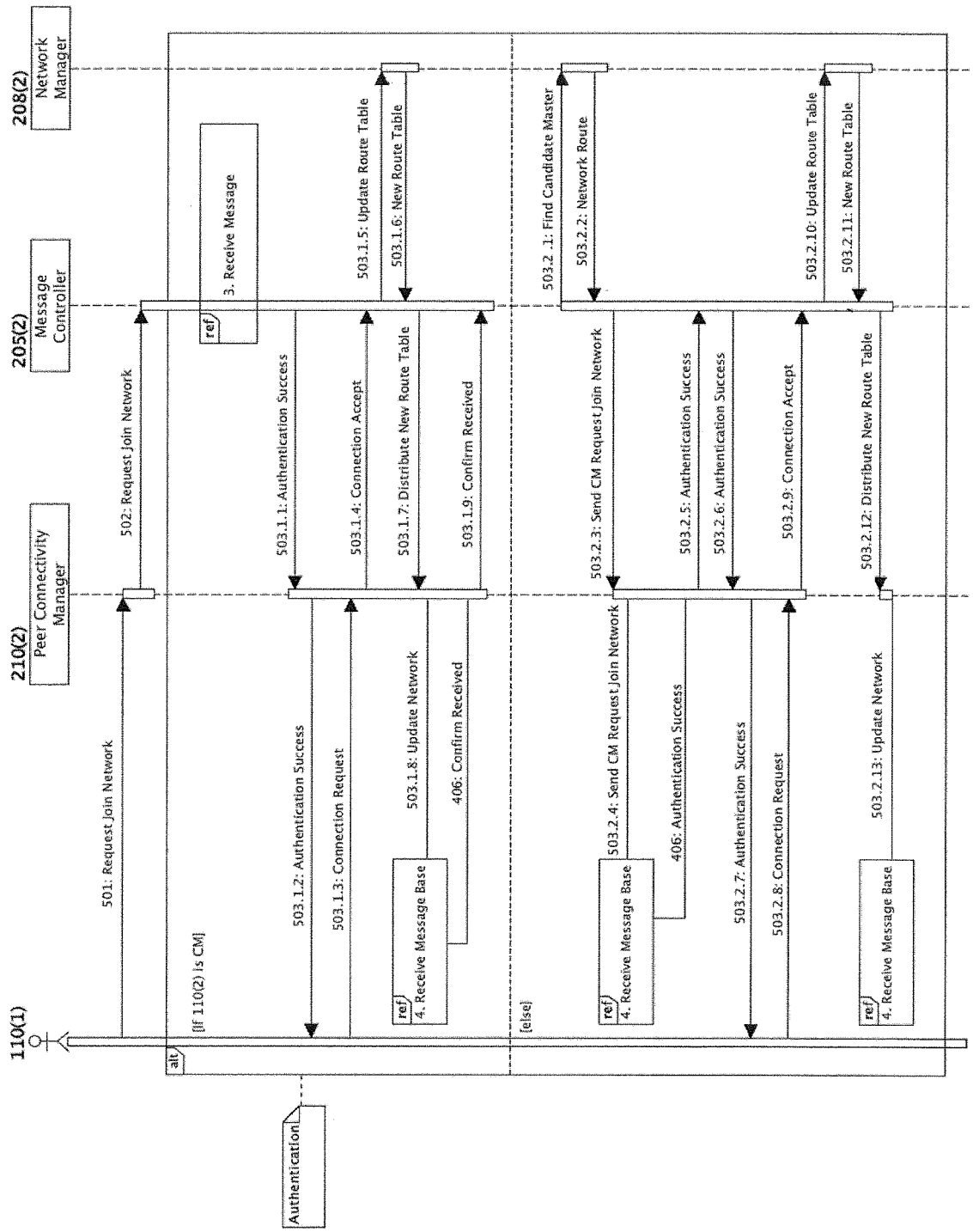
FIG. 5 illustrates the process for receiving a message from the cloud/on-board service; to the device.

The following figures describe the procedure used by devices for sending messages within the peer-to-peer network (FIGS. 3, 4, 6 and 7) and to join an existing peer-to-peer network (FIG. 5). FIGS. 3 and 4 describe basic functions that will be used as modules or subroutines in other, more complex figures.

FIG. 3 describes a basic function called "Receive Message" that will be referred to in the figures that follow. The "Receive Message" function handles several message types that are read by the message controller 205. The number 301.1.1 denotes that we are talking about a broad step 301, a case 1 within 301, and step 1 within case 1 of 301. If the message type that is received is "Update Network," the message controller 205 sends an "Update Route Table" message 301.1.1 to the network manager 208 in order to update the route table, which is a representation of the current devices and connections in the peer-to-peer network. The network manager 208 then responds with a "Confirm Received" message 301.1.2 that the message to update the route table was received and acted upon (by updating the network table). If the message type received by the message controller 205 is "Join Network" and the peer-to-peer network is connected to the cloud/on-board service 107 through one of its CMs, this indicates that a new node is requesting to join the peer-to-peer network. The message controller 205 sends an "Authentication Request" message 301.2.1 to the web service controller 204, and this "Authentication Request" message 301.2.2 is further relayed to the cloud/on-board service 107 which can be thought of as containing a list of device IDs that indicate which devices are permitted to join the peer-to-peer network. It should be obvious to the reader that other techniques to verify if a device 101 can join a particular peer-to-peer network can also be used here.

Once the device joining the network is recognized by the cloud/on-board service 107, an "Authentication Success" message 301.2.3 is sent back to the web service controller 204, and this "Authentication Success" message 301.2.4 is relayed to the message controller 205. In case the received message is of the type "Join Network", and there is no connection between the device 110 and the cloud/On-board service 107, an "Authentication Request" message 301.3.1 is sent to the security module 203, which responds to the message controller 305 with the "Authentication Success" message 301.3.2. If the device 110 is a CM, and the message type is "to Server" (which means the recipient of the message is the cloud/on-board service 107), the message is sent 301.4.1 to the web service controller 204, which then sends this message 301.4.2 to the cloud/on-board service 107. The message controller 205 may receive instructions to store the message 302 in the database 209. Finally, the message controller 205 may also receive instructions to display a message 303 using the display component 201. In the following figures, numbers within brackets "(",")" denote different devices in the peer-to-peer network (for example, 110(1), 110(2), etc.) or components residing within a particular device (for example, 210(2) refers to the peer connectivity manager 210 in device 110(2)).

FIG. 4 describes the steps within a basic function "Receive Message Base," that uses the "Receive Message" function that was described in FIG. 3, to send messages from one peer 110(1) to another 110(3) in the network. These devices that are exchanging messages, 110(1) and 110(3) in the peer-to-peer network may not be neighbors. Thus, the message may have to be relayed through another intermediate device (or any number of intermediate devices that connect the origin of the message to the intended destination of the message). This process will now be discussed in detail now. When device 110(1) sends a message 401, it is received by the peer connectivity manager 210(2) of a neighboring device 110(2). The peer connectivity manager 210(2) sends this message to the message controller 205(2), which then sends a "Decryption Request" message 403 to the security component 203(2) for decryption of the received message. Once the message is decrypted by the security component 203(2), a "Message Decrypted" message is sent back to the message controller 205(2). If device 110(2) is the final recipient (see "if 110(2) is recipient" condition), the "Receive Message" function from FIG. 3 is run with the different conditions described within. Once the appropriate message type is dealt with within the "Receive Message" function in FIG. 3, a "Confirm Received" message or an "Authentication Success" message 405.1.1 is sent back to the peer connectivity manager 210(2), which is then forwarded 406 to device 110(1). In the case where the neighboring device 110(2) is not the final recipient of the message (see "if 110(2) is not recipient" condition), the message needs to be relayed to the next node 110(3) that is connected to 110(2). Other cases where the message needs to be relayed is if the message type is a "Broadcast" or "Update Network," since all devices in the peer-to-peer network will require this type of information. In all these cases (where 110(2) is not the final recipient, or the message type is "Broadcast" or "Update Network"), the Message Controller 205(2) relays the message 405.2.1 to the next device (here, 110(3)) in the route for that particular message via the peer connectivity manager 210(2). Note that in some cases described above, the message may need to be decrypted, partially decrypted, or may remain encrypted throughout. To further explain this, assume that the message payload contains a) message content (or text), b) a message type and c) other meta-data such as the route in which the message has to traverse. The route may be dependent on the use case in question—while some implementations of the current invention may require optimum routing from any origin device to a destination device, others may enforce a constraint that requires the message to pass through a CM. These routes are outputs of the network manager 208 component that also stores the entire network structure. In cases where 110(2) is the final recipient, all parts of the message (a), b) and c) above) may need to be decrypted. But when relaying a private message, a) may remain encrypted, but b) and c) may have to be decrypted.

FIG. 5 describes a process by which a new device 110(1) joins an existing peer-to-peer network. To join the peer-to-peer network, device 110(1) sends a "Request Join Network" message 501 to device 110(2). The peer connectivity manager 210(2) receives this request and sends a "Request Join Network" message 502 to its message controller 205 (2). At this point, two different cases are followed depending on whether or not the message controller 205(2) identifies its host device 110(2) as a CM.

Case 1: If device 110(2) is identified as a CM by the message controller 205(2) (see "if 110(2) is CM" condition), the "Receive Message" function shown in FIG. 3 executes the appropriate case. Once the appropriate message type is handled within the "Receive Message" function, an "Authentication Success" message 503.1.1 is sent back to the peer connectivity manager for peer 210(2), which is then forwarded 503.1.2 to peer 110(1). Once the new device 110(1) receives the "Authentication Success" message, it can now send a "Connection Request" message 5031.3 for joining the network to the peer connectivity manager 201(2). The "Authentication Success" message can be in the form of a token, cookie, certificate, or any other authentication payload. 210(2) accepts the connection request, connects with the new device, and sends a "Connection Accept" message 503.1.4 to the message controller 205(2). The message controller 205(2) sends an "Update Route Table" message 503.1.5 to the network manager 208(2) to regenerate the network routing table. A "New Route Table" message 503.1.6 is sent back to the message controller 205(2). The message controller 205(2) then generates a "Distribute New Route Table" message 503.1.7 and sends it to the peer connectivity manager 210(2). Upon receiving the 503.1.7 message, the peer connectivity manager 210(2) distributes the new route table along with an "Update Network" message 503.1.8 to its peers. The "Receive Message Base" function displayed in FIG. 4 executes the appropriate case. Once the "Confirm Received" message 406 is sent back to the peer connectivity manager 210(2), the peer connectivity manager 210(2) generates a "Confirm Received" message 503.1.9 and sends it to the message controller 205(2).

Case 2: If the device is not identified as a CM by the message controller 205(2), the message controller sends a "Find Candidate Master" message 503.2.1 to the network manager 208(2) for generating routes to the other CMs. The network manager 208(2) sends a "Network Route" message 503.2.2 back to the message controller 205(2). This message is then regenerated as a "Send CM Request Join Network" message 503.2.3 and is sent from the message controller 205(2) to the peer connectivity manager 210(2). The peer connectivity manager 210(2) forwards the message 503.2.4 to the "Receive Message Base" function from FIG. 4. Once an "Authentication Success" message 406 is sent back to the peer connectivity manager 210(2), an "Authentication Success" message 503.2.5 is forwarded to the message controller 205(2). The message controller 205(2) generates an access token and sends it along with an "Authentication Success" message 503.2.6 to the peer connectivity manager 210(2), which then forwards the "Authentication Success" message 503.2.7 to peer 110(1).

Once the new device receives the "Authentication Success" message, it sends a "Connection Request" message 503.2.8 for joining the network to the peer connectivity network 201(2). The peer connectivity network 210(2) accepts the connection request, connects with the new device, and sends a "Connection Accept" message 503.2.9 to the message controller 205(2). The message controller 205(2) sends an "Update Route Table" message 503.2.10 to the network manager 208(2) to regenerate the network routing table. A "New Route Table" message 503.2.11 is sent back to the message controller 205(2). The message controller 205(2) then generates a "Distribute New Route Table" message 503.2.12 and sends it to the peer connectivity manager 210(2). Upon receiving the 503.2.12 message, the peer connectivity manager 210(2) distributes the new route table along with an "Update Network" message 503.2.13 to its peers. The "Receive Message Base" function displayed in FIG. 4 executes the appropriate case.

Figure 6:
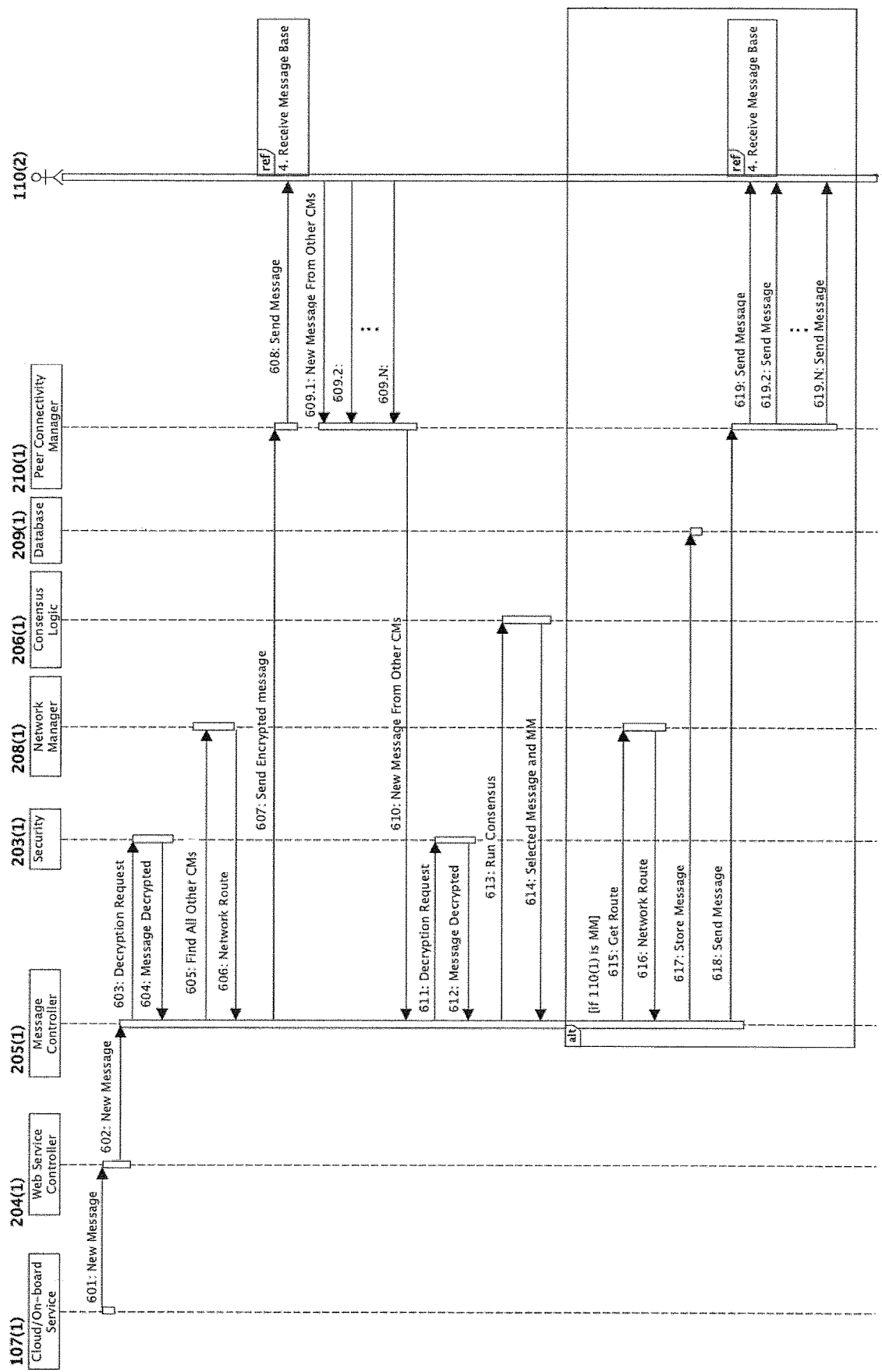
FIG. 6 illustrates the process for a device to send a message to another device on the peer-to-peer network.

FIG. 6 describes the process by which the cloud/on-board service 107 sends a message to the network. All of the messages from the cloud/on-board service 107 go through the CMs to other devices 110 in the network. All CMs that receive the message from the cloud/on-board service 107 process the message, if necessary, and send the processed result to the other CM(s). Upon receiving all processed results from other CMs, all CMs run consensus rules in their respective consensus logic components 206 and select the Main Master (MM). The selected MM then distributes the correct message to all intended recipients of the message in the peer-to-peer network. This process is discussed in more detail below.

When the cloud/On-board service 107(1) sends a "New Message" 601 to the network, the "New Message" 601 must be received by the web service controller 204(1), which forwards the "New Message" 602 to the message controller 205(1). Since the received message is encrypted, the message controller 205(1) has to send a "Decryption Request" request 603 to the security component 203(1) for decryption. A "Message Decrypted" message 604, which contains the decrypted message, is sent back to the message controller 205(1). The message controller 205(1) needs to find out where all other candidate masters are located; it sends a "Find All Other CMs" message 605 to the network manager 208(1). The network manager 208(1) generates routes and sends the routes as a "Network Route" message 606 to the message controller 205(1). Once the message controller 205(1) receives the route paths, which are the paths from itself to the other CMs, the message controller 205(1) sends an encrypted message along with the route paths as the "Send Encrypted message" message 607 to the peer connectivity manager 210(1). The peer connectivity manager 210(1) then forwards the message 608 to devices 110(2), which are its adjacent peers, to find the CMs. The "Receive Message Base" function described in FIG. 4 then executes the appropriate case. The peer connectivity manager 210(1) expects to receive messages (609.1, 609.2, . . . 609.N) from other CMs. Once the Peer Connectivity Manager 210(1) receives these messages, it forwards the "New Message From Other CMs" message 610 to the message controller 205(1). In order to read the message from the peer connectivity manager 210(1), the message controller 205(1) sends the "Decryption Request" message 611 along with the encrypted messages to the security component 203(1). The "Message Decrypted" message 612 is then sent back to the message controller 205(1). The message controller 205(1) sends all messages 613, which were received by itself and by other CMs, to consensus logic component 206(1). The consensus logic component 206(1) runs according to the defined consensus rules and selects the MM and the message from that MM. The consensus logic component 206(1) sends these results back to the message controller 205(1) as message "Selected Message and MM" message 614. At this point, if the device 110(1) is identified as the Main Master (MM) by the message controller 205(1) (see "if 110(1) is MM" condition), the device's message controller 205(1) sends a "Get Route" message 615 to the network manager 208(1). The network manager 208(1) generates routes and sends a "Network Route" message 616 back to the message controller 205(1). The message controller 205(1) stores the selected message by sending a "Store Message" message 617 to the database 209(1). Also, the message controller 205(1) sends the "Send Message" message 618, which contains the message routes and the message payload, to the peer connectivity manager 210(1). Based on the network routes, the peer connectivity manager 210(1) sends the "Send Message" message 619 out to its adjacent peers 110(2). The "Receive Message Base" function described in FIG. 4 executes the appropriate case.

Figure 7:
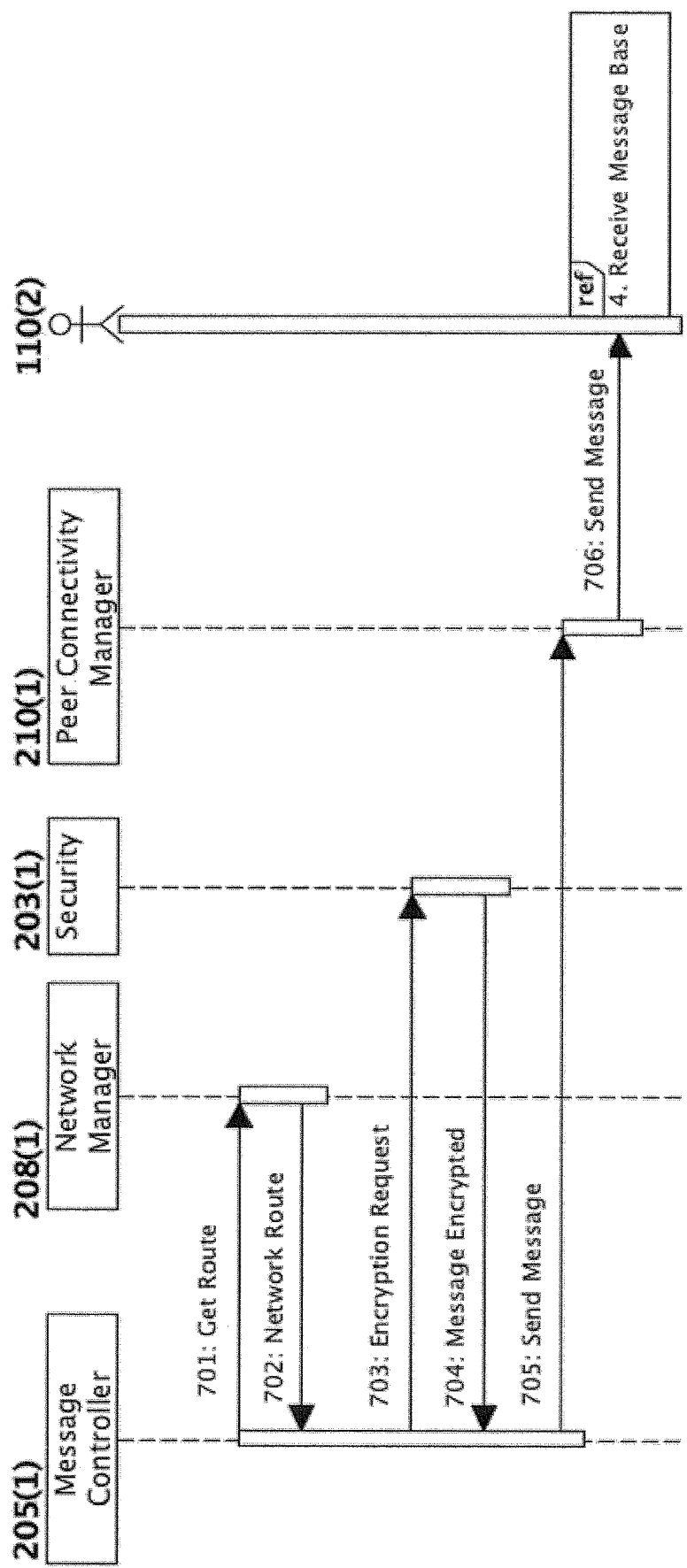
FIG. 7 illustrates the steps for sending a direct message from a device to a recipient or for broadcasting a message to all peers in the network.

FIG. 7 describes the steps for sending a direct message from a device 110 to a recipient or for broadcasting a message to all peers in the network. This process is discussed in detail below.

The message that is sent out from the message controller 205(1) contains two parts. The first part is a list of message recipients and the second part is the message itself, which also contains the message type. When the message controller 205(1) receives a message, it sends a "Get Route" message 701 to the network manager 208(1); the "Get Route" message 701 contains a list of the message recipients. The network manager 208(1) generates the routes from the device 110(1) to the message recipients, and sends the routes back to the message controller 205(1) as the "Network Route" message 702. The message controller 205(1) sends an "Encryption Request" message 703 along with the message to be encrypted to the security component 203(1). The "Message Encrypted" message 704 is sent back to the message controller 205(1). The message controller 205(1) then sends the network routes from 702 and the encrypted message from 704 to the peer connectivity manager 210(1). Based on the network routes, the peer connectivity manager 210(1) sends the "Send Message" message 706 out to its adjacent peers 110(2). The "Receive Message Base" function described in FIG. 4 executes for the appropriate case.

Although a few embodiments of the present invention have been shown and described, it would be appreciated by those skilled in the art that changes may be made in this embodiment without departing from the principles and spirit of the invention, the scope of which is defined in the claims and their equivalents.

REFERENCES

Perrin, E., Tristant, F., Gouverneur, S., Fayat, R., Guiffaut, C., Reineix, A., & Moreau, J. P. (2008, September). *Study of Electric Field Radiated by WiFi Sources Inside an Aircraft-3D Computations and Real Tests*. In Electromagnetic Compatibility-EMC Europe, 2008 International Symposium on (pp. 1-5). IEEE.

Schreckenbach, F., Schnell, M., Scalise, S., & Kissling, C. (2007). *NEWSKY-Networking the Sky for Aeronautical Communications*. In KA and Broadband Communications Conference 2007.

Werner, M., & Holzbock, M. (2001). *Aeronautical Broadband Communications Via Satellite*. DGLR BERICHT, (1), 103-116.

Min, B. (2006, February). *Aeronautical Broadcast and Communication System*. In 22nd AIAA International Communications Satellite Systems Conference & Exhibit 2004 (ICSSC) (p. 3169).

Volner, R. (2011). *Aircraft Data Networks-Integrated System*. Electronical Technical Journal of Technology, Engineering and Logistic in Transport, 6(5).

Wargo, C. A., & Dhas, C. (2003, March). *Security Considerations for the E-enabled Aircraft*. In Aerospace Conference, 2003. Proceedings. 2003 IEEE (Vol. 4, pp. 4_1533-4_1550). IEEE.

What is claimed is:

1. A network which is on-board an aircraft, comprising:
    a plurality of connected devices, wherein at least one of the plurality of connected devices receives information from a source external to the network; and
    a consensus component to perform consensus on the at least one of the plurality of connected devices which receives the information from the source to determine a main master and whether the information is correct through the consensus;
    wherein the main master sends the correct information to another device or devices of the plurality of connected devices other than the at least one of the plurality of connected devices.

2. The network as claimed in claim 1, wherein the at least one of the plurality of connected devices which receives the information from the source is plural in number, and the consensus component performs the consensus on the plural number of connected devices which receives the information from the source to determine the main master, wherein the information is the same across the plural number of connected devices which receives the information from the source.

3. The network as claimed in claim 1, wherein the at least one of the plurality of connected devices which receives the information from the source is plural in number, and wherein at least one of the plurality of connected devices does not receive any information from the source, and the consensus component performs the consensus on the plural number of connected devices which receives the information from the source and the at least one of the plurality of connected devices which does not receive any information from the source to determine the main master.

4. The network as claimed in claim 1, wherein the at least one of the plurality of connected devices which receives the information from the source is plural in number, and the consensus component performs the consensus on the plural number of connected devices which receives the information from the source to determine the main master, wherein the information is different in at least one of the plural number of connected devices which receives the information from the source.

5. The network as claimed in claim 1, wherein:
    the at least one of the plurality of connected devices is plural in number;
    the information is in a form of messages;
    the main master sends the messages to connected devices of the plurality of connected devices other than the at least one of the plurality of connected devices;
    the network further comprising:
        each of the plurality of connected devices comprising a processor to send the messages from peer to peer amongst the plurality of connected devices, the messages being encrypted or not encrypted;

wherein:
one of the plurality of connected devices receives the messages from the main master is a final recipient of the messages; or
wherein the one of the plurality of connected devices receiving the messages from the main master is not the final recipient of the messages, and the messages come with an instruction to be broadcast to other ones of the plurality of connected devices, in which case the one of the plurality of connected devices receiving the messages relays the messages to the other ones of the plurality of connected devices until the messages reach a final recipient of the plurality of connected devices.

6. The network as claimed in claim 1, wherein:
the at least one of the plurality of connected devices is plural in number, and each is a candidate master;
the information is in a form of messages;
the network further comprising:
each of the plurality of connected devices comprising a processor to send the messages from peer to peer amongst the plurality of connected devices, the messages being encrypted or not encrypted;
wherein a new device requests to join the network by sending a request to one of the candidate masters; and
wherein:
the new device is directly connected to the one of the candidate masters receiving the request, and the one of the candidate masters receiving the request authenticates the request of the new device to join the network; or
the new device requesting to join the network is not directly connected to the one of the candidate masters receiving the request, and the request is sent to the one of the candidate masters receiving the request by relaying the request through other ones of the plurality of connected devices, and an authenticating message is sent to the new device from the one of the candidate masters receiving the request by relaying the authenticating message through the other ones of the plurality of connected devices.

7. The network as claimed in claim 1, wherein:
the at least one of the plurality of connected devices is plural in number, and each is a candidate master;
the information is in a form of messages; and
the network further comprising:
each of the plurality of connected devices comprising a processor to send the messages from peer to peer amongst the plurality of connected devices, the messages being encrypted or not encrypted;
wherein the candidate masters receive the messages from a cloud or on-board service;
wherein each candidate master finds all other candidate masters in the network, and runs a consensus algorithm to determine which of the candidate masters is the main master;
wherein the candidate master determined as the main master determines a network route that connects the main master to a peer that is an intended recipient of the messages from the cloud or on-board service, or wherein the candidate master determined as the main master determines a plurality of network routes that connect the main master to a plurality of peers that are intended recipients of the messages from the cloud or on-board service; and wherein the main master sends the messages received from the cloud or on-board service to one or more of the intended recipients of the messages in the network.

8. The network as claimed in claim 1, wherein:
the at least one of the plurality of connected devices is plural in number, and each is a candidate master;
the information is in a form of messages; and
the network further comprising:
each of the plurality of connected devices comprising a processor to send the messages from peer to peer amongst the plurality of connected devices, the messages being encrypted or not encrypted;
wherein the candidate masters receive the messages from a cloud or on-board service;
wherein one of the plurality of connected devices determines a network route that connects to a peer that is an intended recipient of the messages from the cloud or on-board service, or wherein the one of plurality of connected devices determines a plurality of network routes that connect the plurality of connected devices to a plurality of peers that are intended recipients of the messages from the cloud or on-board service; and
wherein the one of the plurality of connected device sends the messages to one or more of the intended recipients of the messages in the network.

9. A method for a network of a plurality of connected devices which is on-board an aircraft, comprising:
receiving information by at least one of the plurality of connected devices from a source external to the network; and
performing consensus on the at least one of the plurality of connected devices which receives the information from the source to determine a main master and whether the information is correct through the consensus; and
sending the correct information from the main master to another device or devices of the plurality of connected devices other than the at least one of the plurality of connected devices.

10. The method as claimed in claim 9, wherein the at least one of the plurality of connected devices which receives the information from the source is plural in number, the method further comprising receiving the information by the plural number of connected devices which receives the information from the source, and performing the consensus on the plural number of connected devices which receives the information from the source to determine the main master, wherein the information is the same across the plural number of connected devices which receives the information from the source.

11. The method as claimed in claim 9, wherein the at least one of the plurality of connected devices which receives the information from the source is plural in number, and at least one of the plurality of connected devices does not receive any information from the source, the method further comprising performing the consensus on the plural number of connected devices which receives the information from the source and the at least one of the plurality of connected devices which does not receive any information from the source to determine the main master.

12. The method as claimed in claim 9, wherein the at least one of the plurality of connected devices which receives the information from the source is plural in number, the method further comprising performing the consensus on the plural number of connected devices which receives the information from the source to determine the main master wherein the information is different in at least one of the plural number of connected devices which receives the information from the source.

13. The method as claimed in claim 9, wherein:
the at least one of the plurality of connected devices is plural in number; and
the information is in a form of messages; and
the method further comprising;
sending the messages from the main master to connected devices of the plurality of connected devices other than the at least one of the plurality of connected devices;
sending the messages from peer to peer amongst the plurality of connected devices, the messages being encrypted or not encrypted;
wherein:
one of the plurality of connected devices which receives the messages from the main master is a final recipient of the messages; or
wherein the one of the plurality of connecting devices receiving the messages from the main master is not the final recipient of the messages, and the messages come with an instruction to be broadcast to other ones of the plurality of connected devices, in which case the one of the plurality of connected devices receiving the messages relays the messages to the other ones of the plurality of connected devices until the messages reach a final recipient of the plurality of connected devices.

14. The method as claimed in claim 9, wherein:
the at least one of the plurality of connected devices is plural in number, and each is a candidate master;
the information is in a form of messages;
method further comprising:
sending the messages from peer to peer amongst the plurality of connected devices, the messages being encrypted or not encrypted; and
requesting by a new device to join the network by sending a request to one of the candidate masters; and
wherein:
the new device is directly connected to the one of the candidate masters receiving the request, and the one of the candidate masters receiving the request authenticates the request of the new device to join the network; or
the new device requesting to join the network is not directly connected to the one of the candidate masters receiving the request, and the request is sent to the one of the candidate masters receiving the request by relaying the request through other ones of the plurality of connected devices, and an authenticating message is sent to the new device from the one of the candidate masters receiving the request by relaying the authenticating message through the other ones of the plurality of connected devices.

15. The method as claimed in claim 9, wherein:
the at least one of the plurality of connected devices is plural in number, and each is a candidate master; and
the information is in a form of messages; and
the method further comprising:
sending the messages from peer to peer amongst the plurality of connected devices, the messages being encrypted or not encrypted;
wherein the candidate masters receive the messages from a cloud or on-board service;
wherein each of the candidate masters finds all other candidate masters in the network, and runs a consensus algorithm to determine which of the candidate masters is the main master;
wherein the candidate master determined as the main master determines a network route that connects the main master to a peer that is an intended recipient of the messages from the cloud or on-board service, or wherein the candidate master determined as the main master determines a plurality of network routes that connect the main master to a plurality of peers that are intended recipients of the messages from the cloud or on-board service; and
wherein the main master sends the messages received from the cloud or on-board service to one or more of the intended recipients of the messages in the network.

16. The method as claimed in claim 9, wherein:
the at least one of the plurality of connected devices is plural in number, and each is a candidate master; and
the information is in a form of messages; and
the method further comprising:
sending the messages from peer to peer amongst the plurality of connected devices, the messages being encrypted or not encrypted;
wherein the candidate masters receive the messages from a cloud or on-board service;
wherein one of the plurality of connected devices determines a network route that connects to a peer that is an intended recipient of the messages from the cloud or on-board service, or wherein the one of the plurality of connected devices determines a plurality of network routes that connect the plurality of connected devices to a plurality of peers that are intended recipients of the messages from the cloud or on-board service; and
wherein the one of the plurality of connected device sends the messages to one or more of the intended recipients of the messages in the network.

17. A non-transitory machine-readable medium storing a non-transitory, tangible computer program product comprising computer program code which when executed causes processing elements in a network of a plurality of connected devices which is on-board an aircraft to perform operations comprising:
receiving information by at least one of the plurality of connected devices from a source external to the network; and
performing consensus on the at least one of the plurality of connected devices which receives the information from the source to determine a main master and whether the information is correct through consensus; and
sending the correct information from the main master to another device or other devices of the plurality of connected devices other than the at least one of the plurality of connected devices.

* * * * *